CHRIS TER COCK.
VARIABLE SPEED GEAR.
APPLICATION FILED JUNE 27, 1917.
1,252,241.
Patented Jan. 1, 1918.
2 SHEETS—SHEET 2.
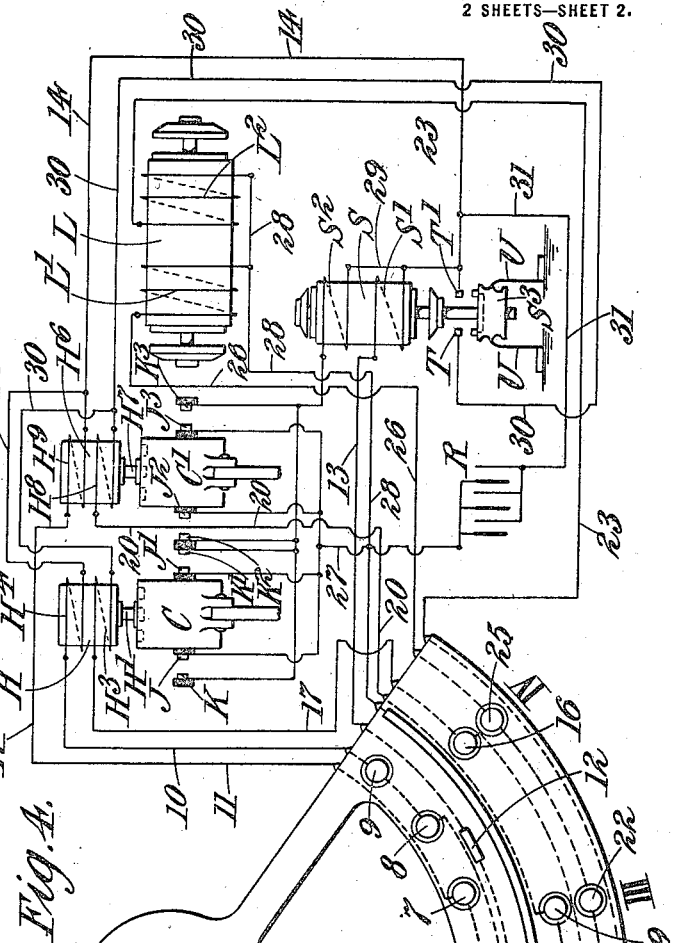
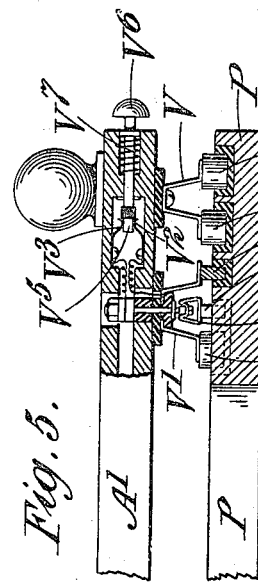
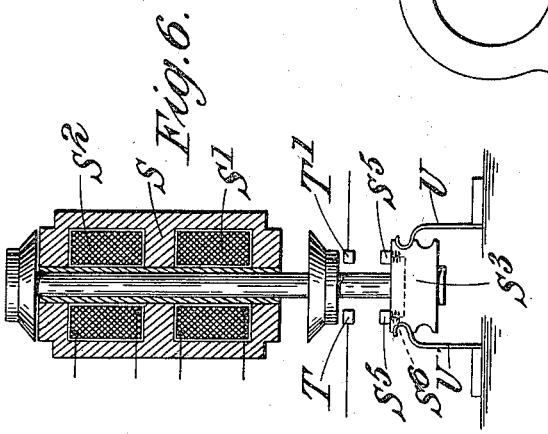
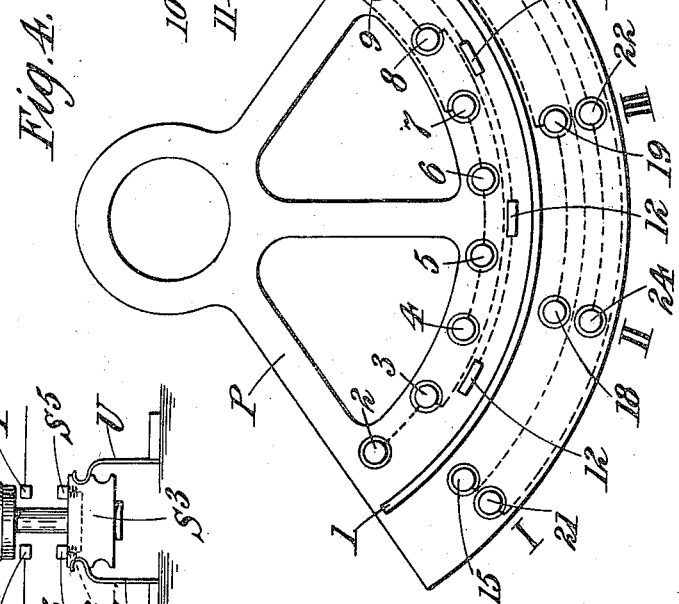

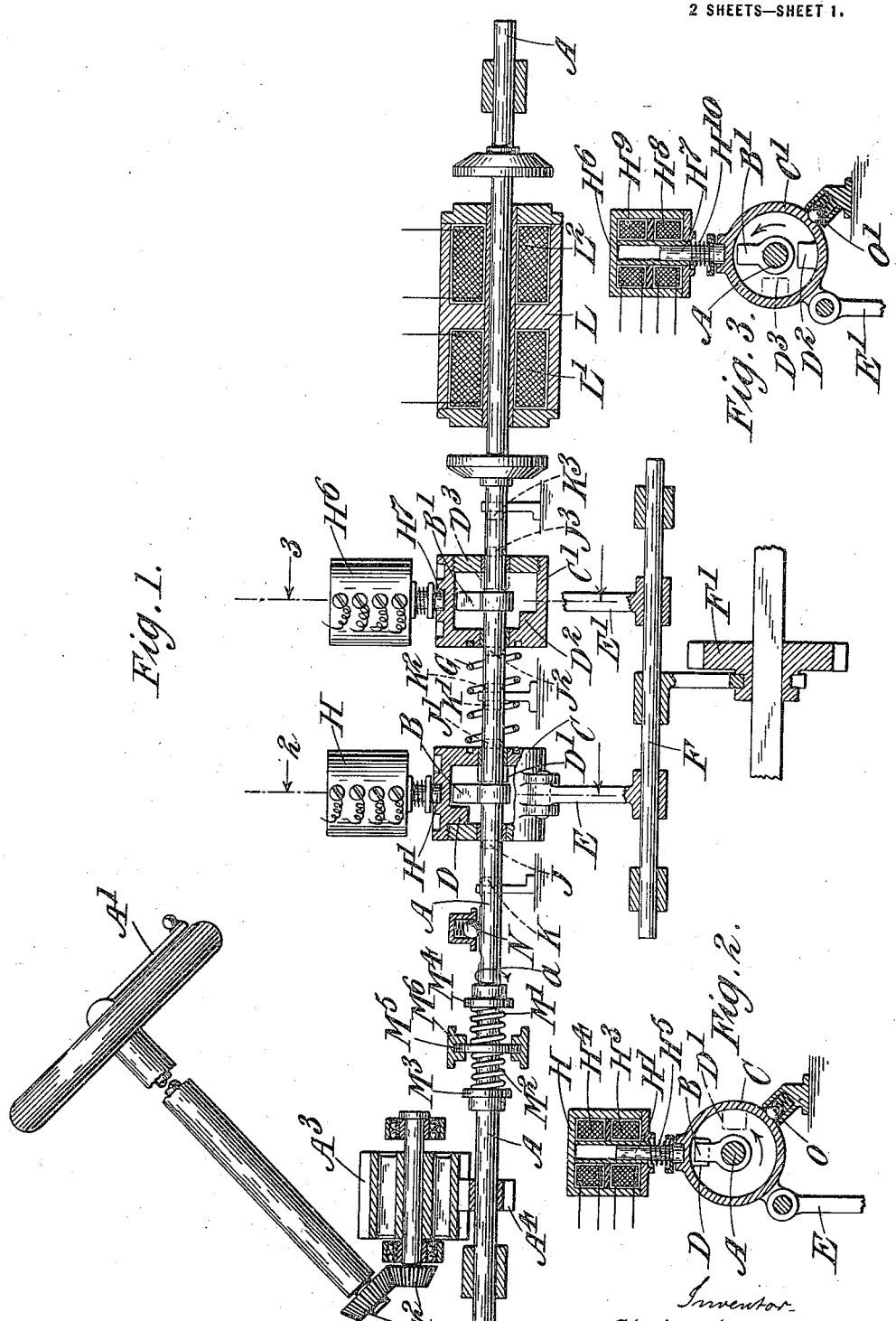

UNITED STATES PATENT OFFICE.

CHRIS TER COCK, OF LONDON, ENGLAND.

VARIABLE-SPEED GEAR.

1,252,241.

Specification of Letters Patent.

Patented Jan. 1, 1918.

Application filed June 27, 1917. Serial No. 177,312.

*To all whom it may concern:*

Be it known that I, CHRIS TER COCK, a subject of the Queen of the Netherlands, and residing at London, in England, have invented certain new and useful Improvements in Variable-Speed Gears, of which the following is a specification.

This invention relates to variable speed gears of the countershaft or lay shaft type having clutches or gear wheels so that the driving and driven shafts can be connected so that they rotate at different speeds by moving the clutches or gear wheels which are slidable upon one or other of the shafts. The present invention has particular reference to mechanism in which the changes of gear are effected by a control shaft capable of rotary motion to select the gear to be operated and also capable of being moved in the direction of its axis to operate the selected gear.

Various arrangements have been proposed whereby the control shaft has been brought into operative connection with gear-operating members mounted upon a shaft parallel to the control shaft.

According to this invention the gear-operating members are mounted concentrically with the control shaft and each gear-operating member has two or more engaging surfaces one or more on each side of the selector on the control shaft, these surfaces being out of alinement so that when the selector is in alinement with one of the surfaces rotary movement of the control shaft is necessary to bring it into position to engage with the other surface.

The gear-operating members are joined, say, by rods or levers, in any convenient way to the clutch members or loose gear wheels of the gear box.

Both the rotary or selecting movement and the movement in the direction of the axis of the shaft or operating movement may be brought about electrically in any well known way or on the other hand both motions may be imparted to the members concerned purely mechanically but a convenient construction particularly applicable for use with a variable speed gear for a self-propelled road vehicle, is one in which the rotary movement is effected by hand through suitable gearing while the movement in the direction of the axis of the shaft is brought about by one or more solenoids.

Such a construction is illustrated diagrammatically in the accompanying drawings, in which—

Figure 1 is a longitudinal section showing the essential parts of the gear in the neutral position.

Fig. 2 is a transverse section on the line 2—2 of Fig. 1 looking in the direction of the arrow.

Fig. 3 is a section on the line 3—3 looking in the direction of the arrow.

Fig. 4 is a diagram showing the controller and electrical connections.

Fig. 5 shows in detail a part of the controller lever, and

Fig. 6 is a sectional view on a larger scale of a switch forming part of Fig. 4.

With reference first to Fig. 1, A is a control shaft which can be partially rotated by a lever A' acting through bevel gear A² and a long pinion A³ which engages with a spur wheel A⁴ on the shaft A the arrangement being such that the shaft A may be moved in the direction of its axis without disengaging the spur wheel A⁴ from the long pinion A³.

Upon the shaft A are mounted two selector members B and B' which coöperate respectively with two gear-operating members C and C' each mounted around the shaft A which can, in some positions, slide through them. The gear-operating members C and C' are box-like structures inclosing the selector members B and B' respectively. The gear-operating member C has two internal projecting portions D and D' at 90° to each other and on opposite sides of the selector member B. The other gear-operating member C' is similarly provided with internally projecting members D² and D³. These projections D, D', D² and D³ form engaging surfaces coöperating with the selector members B and B' when the control shaft A is turned into the appropriate positions. This arrangement is only given by way of example and is suitable for a variable speed gear which is only required to give, say, three forward speeds, a reverse speed and a neutral position.

The gear-operating member C is provided with a rod E connected to a spindle F slidably mounted in bearings and connected to one of the loose wheels F' of the change speed gear. Another rod E' connected to the gear-operating member C' would be similarly operatively connected to another loose gear wheel which, however, is not shown in the drawings. It will be understood that the variable speed gear itself may be of the well known countershaft or lay shaft type with either clutches or sliding gear wheels. A spring G is placed between the members C and C' and those members are supported in any convenient way so as to slide in bearings which are, however, not shown in the diagram.

The gear-operating member C is provided with three notches any one of which can be engaged by the bolt or pin of a locking device H. This locking device is shown in section in Fig. 2. It is electromagnetic and comprises a pin $H'$ which acts as the core and two coils $H^3$ and $H^4$ either of which when energized can lift the pin $H'$ out of engagement with the notch in the member C against the action of a spring $H^5$ the function of which is to return the pin into its locking position when the coils $H^3$, $H^4$ are neither of them energized.

The member C' is also furnished with three notches and with a locking device $H^6$. This locking device is shown in section in Fig. 3 and comprises a pin $H^7$, coils $H^8$ and $H^9$ and a spring $H^{10}$ all acting in a manner similar to that described with reference to the locking device shown in Fig. 2.

The gear-operating member C carries two contacts J and J' and the member C' is provided with similar contacts $J^2$ and $J^3$. These work in conjunction with fixed contacts K, K', $K^2$ and $K^3$ in a manner described more particularly hereinafter with reference to the diagram.

At the end of the control shaft A remote from the gear $A^2$ $A^3$, etc., is an electromagnet or solenoid L provided with two coils L', $L^2$, the arrangement being such that when the coil L' is energized the shaft A is pulled to the right and when the coil $L^2$ is energized it is moved to the left. The shaft A' tends to be kept in the neutral position shown in the drawings by means of springs M', $M^2$ held between collars $M^3$ $M^4$ on the shaft and having between them a loose collar or washer $M^5$ loosely held in fixed bearings $M^6$. The neutral position of the shaft A is made definite by a spring-pressed ball N which engages with a slight recess in the shaft. A similar device may be employed for making definite the neutral position of the gear-operating members C and C', spring-pressed balls for that purpose being indicated at O and O' in Figs. 2 and 3 respectively.

As shown in Fig. 1 the selector B is in line with the engaging surface D of the gear-operating member C and if therefore the coil $L^2$ of the solenoid L be energized and the locking pin H' of the locking device H withdrawn, the control shaft A will be moved to the left carrying with it the gear-operating member C with its lever or rod E and the connected mechanism. This movement will be sufficient to bring into operation, say, the first forward speed and when that position is reached the gear-operating member C is locked in its new position by the pin H'.

As soon as the coil $L^2$ of the solenoid L is deënergized, which takes place as hereinafter described as soon as the gear-operating member C has been moved into its new position, the control shaft A and the selectors B and B' move back under the influence of the springs M' $M^2$ into their neutral position.

Supposing now it be desired to change the gear to the second forward speed the control shaft A would be rotated clockwise, i. e. in the direction of the arrow a, to bring the selector B' in line with the engaging surface $D^3$ of the gear-operating member C', the electrically controlled locking pin H' would be lifted to allow the gear-operating member C to return to its neutral position, the locking pin $H^7$ would be withdrawn to free the gear-operating member C' and the solenoid coil L' would be energized to cause the shaft A to move to the right in the direction of its axis thus carrying the gear-operating member C' in the same direction to effect the necessary change of gear through the lever E' and the mechanism to which it is connected.

Similarly the selector B' could be brought into position to engage with the surface $D^2$ of the gear-operating member C' by a further rotary motion of the shaft A through 90° to bring the third speed into operation. Or, again, a further rotation of the shaft through another 90° would bring the selector B of the gear-operating member C into line with the engaging surface D' so that a movement of the shaft A to the right through the action of the coil L' would carry the gear-operating member C in that direction to effect, say, a reverse drive. Obviously if the appropriate arrangements are made this last position of the control shaft might be brought about by a partial rotation of the shaft A in a counterclockwise direction through 90° from the position shown in Fig. 1 instead of a clockwise rotation through 270°.

The electrical arrangements by which the longitudinal movement of the control shaft A and the consequent movements of the gear-operating members are brought about are shown by way of example only in Figs. 4 and 5. The quadrant P is intended to be fixed beneath the lever A' and is provided with five rows of contacts the third row being simply a contact bar 1 in permanent connection with a negative pole of an accumulator R. The contacts 2, 3 and 8, 9 of the top row are connected together and are joined by the conductor 10 to one end of the winding H⁴ of the locking device H. Similarly the contacts 4, 5, 6 and 7 of the same row are all connected to the winding H⁹ of the locking device H⁶.

The second row consists of three contacts 12 connected together and by a conductor 13 to one winding S' of an electromagnetic switch S, the other end of that winding being joined by the conductor 14 to the windings H⁴ and H⁹ of the locking devices H and H⁶. This electromagnetic switch S is shown in further detail in Fig. 6 its general construction being similar to that of the solenoid L in that it has two windings S' and S² the winding S' serving to move the core in one direction, i. e. to lift it if the switch is arranged vertically as in Fig. 6, and the other winding S² serving to move the core in the other direction. The end of the core carries a head S³ of insulating material carrying two contacts S⁵ which are connected together and may conveniently be provided with small springs S⁶. Above these contacts S⁵ carried on some fixed support are two other contacts T and T' and when the core is lifted by current passing through the coil S' the gap between these two contacts T and T' is closed by the connected contacts S⁵ being brought up against them. It will be seen that the head S³ is provided with two grooves which are engaged by springs U. When the switch is open i. e. in the position shown in Fig. 6, these springs engage with the upper groove and when the coil S' is energized and the core is lifted the springs engage with the lower groove so that the switch is kept closed when the current in the coil S' is cut off until the coil S² is energized when the core is forced down again into the position shown in Fig. 6 and the circuit is broken at the contacts T T'.

The fourth row of contacts on the quadrant P consists of four members the two end contacts 15 and 16 being joined together and connected by the conductor 17 to the winding H³ of the locking device H. The other two contacts of this row Nos. 18 and 19 are connected together and are joined by the conductor 20 to the coil H⁸ of the locking device H⁶.

The first and third contacts Nos. 21 and 22 of the fifth row are connected together and are joined by the conductor 23 to the coil L² of the solenoid L while the second and fourth contacts Nos. 24 and 25 are connected together and are joined by the conductor 26 to the coil L' of the solenoid.

The contacts J, J', J² and J³ carried by the gear-operating members C and C' are all joined through the conductor 27 to the negative pole of the accumulator R and that pole is also joined by the conductor 28 to each of the windings L' and L² of the solenoid L. The fixed contacts K, K', K² and K³ coöperating with the contacts J, J', J² and J³ respectively are all connected to the winding S² of the electromagnetic switch S, the other end of that winding being joined by a conductor 29 to the winding S' of the switch, to the contact T' and also by the conductor 14 to the windings H⁴ and H⁹ of the locking devices H and H⁶. The other contact T of the switch S is joined by the conductor 30 to the windings H³ and H⁸ of the locking devices H and H⁶. The positive pole of the accumulator R is joined by a conductor 31 to the conductor 14 and thus to the various points which are in permanent electrical connection with that conductor.

The arm or lever A' which moves over the quadrant P carries three contacts which coöperate with the contacts on the quadrant. These contacts carried by the arm A' are shown in Fig. 5 which is a sectional view drawn to a somewhat larger scale of a portion of the arm A' in position over the quadrant P. One contact V is simply a bridge adapted to connect the contacts forming the fourth and fifth rows together when the arm is above them. Another contact V' serves to connect the contact bar 1 of the quadrant with the contacts 2, 3, 4, 5, etc., forming the first row. This contact V' is in permanent electrical connection with a spring contact V² contained in a cavity in the arm A' and another spring contact V³ opposite the spring contact V² is joined through an insulated stud to another contact V⁴ which slides over and makes connection with the contacts 12 forming the second row on the quadrant P. The gap between the spring contacts V² and V³ is normally closed by a connecting plug V⁵ on the end of a push rod V⁶ carried by the arm A' but if the rod V⁶ be pushed in against its spring V⁷ insulation is interposed between the spring contacts V² and V³ to break the circuit between the contact V' and the contact V⁴. As the contacts 12 over which the contact V⁴ passes are joined to the coil S' of the electromagnetic switch S which acts to close the circuit controlled by that switch it is obvious that if the push rod V⁶ is pushed in no current can flow through that coil and consequently the electromagnetic switch cannot be closed. This provision is made so that the electromagnetic switch need not be energized when the lever is moved quickly from, say, the first speed to the second or fourth speeds so that the intermediate speeds are not put into operation.

The pairs of contacts 15, 21; 18, 24; 19, 22 and 16, 25 are those which must be beneath the arm A' for the first, second, third and fourth or reverse speeds respectively and for that reason the numbers I, II, III and IV are placed adjacent to those contacts in Fig. 4.

Suppose now that the gear is in the neutral position as shown in Fig. 1 and it be desired to bring the first speed into operation. The arm A' would first be moved into such a position that it was over one of the contacts 12, say, for example, the left hand contact 12 as shown in Fig. 4. The push rod $V^6$ is not pushed in and consequently the contact 12 is connected to the bar 1. Current therefore flows from the positive pole of the accumulator through conductor 31, coil S', conductor 13, contact 12, contact bar 1 to the negative pole of the accumulator. The coil S' is energized, the core of the electromagnetic switch is pulled up and the gap between the contacts T and T' is closed and will remain closed until the switch $S^2$ is energized.

The switch arm A' is now moved over the contacts 15, 21 which are accordingly connected by the contact V. The circuit now is from the positive pole of the accumulator R, through conductor 31, contacts T, T', conductor 30, coil $H^3$ of the locking device H, conductor 17, contacts 15, 21, conductor 23, coil $L^2$ of the solenoid L to the negative pole of the accumulator. Thus the locking pin H' is raised and frees the gear-operating member C, the coil $L^2$ of the solenoid is energized and moves the control shaft A to the left carrying with it the gear-operating member C and shifting the gear into the first speed. At the end of this movement of the gear-operating member C the contact J makes connection with the fixed contact K, this completes the circuit through the coil $S^2$ of the electromagnetic switch S and pulls the core down, opening the main circuit at the contacts T T'. The effect of this is to deënergize the coil $H^3$ of the locking device H and consequently the pin H' falls and locks the gear-operating member in its new position. The coil $L^2$ of the solenoid is also deënergized and the control shaft A will be shifted back into its neutral position by the action of the springs M' $M^2$ although it does not carry the gear-operating member with it. While the arm A' remains in this position over the contacts 15, 21 the gear will continue to run on the first speed but no current will be taken from the accumulator R. Supposing now it be desired to change from the first speed to the second speed, the arm is moved to the right from position I to position II. The arm first passes over the contact 3 and the effect of this is to energize the coil $H^4$ of the locking device H and lift the pin H' to allow the gear member C to go back into its neutral position. It is to be noted that the two coils $H^4$ and $H^9$ are independent of the circuit controlled by the switch S for one end of each of these coils is connected through the conductors 14 and 31 permanently to the positive pole of the accumulator R. Thus when either of the contacts 2, 3; 4, 5, etc., in the first row of contacts on the quadrant is connected to the contact bar 1 i. e. to the negative pole of the accumulator, either the coil $H^4$ or the coil $H^9$ is energized to lift the locking pin and allow the gear-operating member which it controls to take up its neutral position. It will also be noticed that the contacts 2, 3; 4, 5, etc., are joined in pairs disposed on either side of the position occupied by the arm A' when it is over the contacts controlling the speed positions. The object of this is to insure that the locking pins shall be lifted to allow the gear-operating members to return to their neutral positions before any operating circuits can be completed by the further movement of the arm A'.

After passing over the contact 3 the arm A' still moving to the right passes over the contact 12. The push rod $V^6$ is not pushed in consequently the coil S' of the electromagnetic switch S is energized and the main circuit made at the contacts T, T'. Further movement of the arm causes it to pass over the contact 4 energizing the coil $H^9$ of the locking device $H^6$ but as the gear-operating member C' is already in its neutral position the locking pin $H^7$ simply lifts and falls again. The arm now reaches the position II making connection between the contacts 18 and 24. The circuit is now as follows:—from the positive pole of the accumulator through conductor 31, contacts T, T', conductor 30, coil $H^8$ of the locking device $H^6$, conductor 20, contacts 18 and 24, conductor 26, coil L' of the solenoid L, conductor 28 to the negative pole of the accumulator. Hence the locking pin $H^7$ is raised freeing the gear-operating member C', the coil L' pulls the control shaft A to the right and the gear-operating member C' is moved in the same direction and brings the gear into the second speed. When this position is attained the contact $J^3$ makes connection with the contact $K^3$ and completes the circuit through the breaking coil $S^2$ of the electromagnetic switch S, consequently the main circuit is opened at the contacts T, T' and the current is cut off, the gear-operating member C' being engaged in its new position by the locking pin $H^7$.

A similar series of operations will take place when the arm A' is moved from position II to position III or from position III to position IV and so on.

Should it be desired to pass from, say, the first speed to the third or fourth speed without shifting the gear into the intermediate speeds all that it is necessary to do is to push the rod $V^6$ in as the arm A' is passing over the intermediate contacts 12. This prevents the circuit of the coil S' of the switch S being completed and thus has the effect of keeping open the main circuit at the contacts T, T'. The push rod V⁶ would naturally be released before the switch arm passed over the last contact 12 before reaching the position for the speed which it was desired to throw in.

It is to be understood that the angular or setting movement of the control shaft A may be brought about by the movement of the lever A' the gear A², A³, A⁴ being proportioned accordingly and any suitable provision may be made such, for example, as by leaving out a tooth at certain positions of the gear wheels A², A³, A⁴ to insure that the complete angular movement necessary for the setting of the control shaft is made before the coil of the solenoid L is energized to move the shaft longitudinally.

Any convenient adjustment may be provided for the fixed contacts K, K', K², K³ so that they come into operation with the contacts J, J', J², J³ at exactly the right time i. e. when the gears controlled by the members C' and C² are in their proper engaging and disengaging positions.

It is convenient to effect the rotary movement of the control shaft A as described mechanically but if desired electrical means may be employed for that purpose. In such a case a small motor might be used geared to the shaft or again some well known electrical step-by-step mechanism might be employed.

It is to be understood that the construction illustrated is given purely by way of example and may be varied in detail without departing from the spirit of this invention. For instance, the gear-operating members C and C' may have any desired number of engaging surfaces not merely two each as in the particular example shown. Again, the depth of the engaging surfaces may vary so that the gear-operating member would be moved in the same direction but to a greater or less extent depending upon which of the projecting surfaces were selected by the rotary movement of the shaft.

What I claim as my invention and desire to secure by Letters Patent is:—

1. In variable speed gear of the countershaft or lay shaft type having sliding clutches or gear wheels and a control shaft capable of rotary movement to select the gears to be operated and also capable of movement in the direction of its axis to operate the selected gear, the combination with the control shaft and selectors mounted thereon of gear-operating members mounted concentrically with the control shaft each gear-operating member having an engaging surface on each side of the selector these surfaces being out of alinement with each other so that when the selector is in alinement with one of the surfaces rotary movement of the control shaft is necessary to bring it into position to engage with the other surface substantially as set forth.

2. The combination with variable speed gear of the kind described of a control shaft capable of movement in a rotary direction and also in the direction of its axis, a plurality of selecting devices each comprising a selector fixed on the shaft and a gear-operating member concentric therewith and having an engaging surface on each side of the selector, means for moving the shaft in a rotary direction by hand and electromagnetic means for moving the control shaft in the direction of its axis substantially as set forth.

3. In variable speed gear of the kind described the combination of a control shaft capable of movement in a rotary direction and also in the direction of its axis, a plurality of selectors fixed on the shaft, a gear-operating member for each selector, each gear-operating member being concentric with the shaft and having an engaging surface on each side of the selector, a spring tending to keep the gear-operating members apart, means for partially rotating the shaft to set the selectors in relation to the engaging surfaces, a solenoid adapted to move the shaft in the direction of its axis in either direction, a spring for returning the shaft into its neutral position and electrically controlled locking devices for engaging the gear-operating members.

4. In a variable speed gear of the kind described the combination of a control shaft capable of movement in a rotary direction and also in the direction of its axis, a plurality of selectors fixed on the shaft, a gear-operating member for each selector, each gear-operating member being concentric with the shaft and having an engaging surface on each side of the selector, a spring tending to keep the gear-operating members apart, means for partially rotating the shaft to set the selectors in relation to the engaging surfaces, a solenoid adapted to move the shaft in the direction of its axis in either direction, a spring for returning the shaft into its neutral position, electrically controlled locking devices for engaging the gear-operating members and means for breaking the electric circuits of the solenoid and locking devices when the gear has been moved into its operative position.

5. In variable speed gear of the kind described the combination of a control shaft capable of movement in a rotary direction and also in the direction of its axis, a plurality of selectors fixed on the shaft, a gear-operating member for each selector, each gear-operating member being concentric with the shaft and having an engaging surface on each side of the selector, a spring tending to keep the gear-operating members apart, means for partially rotating the shaft to set the selectors in relation to the engaging surfaces, a solenoid adapted to move the shaft in the direction of its axis in either direction, a spring for returning the shaft into its neutral position, electrically controlled locking devices for engaging the gear-operating members, an electromagnetic switch for setting the circuits of the solenoid and locking devices and contacts operated by the gear-operating members and controlling the electromagnetic switch to cause it to open the circuits of the solenoid and locking devices when the gear has been moved into its operative position.

6. In variable speed gear of the kind described the combination of a control shaft capable of movement in a rotary direction and also in the direction of its axis, a plurality of selectors fixed on the shaft, a gear-operating member for each selector, each gear-operating member being concentric with the shaft and having an engaging surface on each side of the selector, a spring tending to keep the gear-operating members apart, means for partially rotating the shaft to set the selectors in relation to the engaging surfaces, a solenoid adapted to move the shaft in the direction of its axis in either direction, a spring for returning the shaft into its neutral position, electrically controlled locking devices for engaging the gear-operating members, an electromagnetic switch for setting the circuits of the solenoid and locking devices, mechanical means for retaining such switch in its closed position until released and contacts operated by the gear-operating members and controlling the electromagnetic switch to cause it to open the circuits of the solenoid and locking devices when the gear has been moved into its operative position.

In testimony whereof I have signed my name to this specification in the presence of two subscribing witnesses.

CHRIS ter COCK.

Witnesses:
   PUTNAM EDWARD DUNBAR KILBOURN.
   ARCHIBALD JOHN FRENCH.

Copies of this patent may be obtained for five cents each, by addressing the "Commissioner of Patents, Washington, D. C."